No. 846,549. PATENTED MAR. 12, 1907.
P. L. CLARK.
LAMINATED WHEEL.
APPLICATION FILED MAR. 3, 1906.

Witnesses
J S Abbott
M. Gertrude Ady

Inventor
Percy L Clark
by Burton Burton
his attys.

UNITED STATES PATENT OFFICE.

PERCY L. CLARK, OF CHAMPAIGN, ILLINOIS, ASSIGNOR TO EMMA F. CLARK, OF CHAMPAIGN, ILLINOIS.

LAMINATED WHEEL.

No. 846,549.   Specification of Letters Patent.   Patented March 12, 1907.

Application filed March 3, 1906. Serial No. 303,937.

*To all whom it may concern:*

Be it known that I, PERCY L. CLARK, a citizen of the United States, residing at Champaign, in the county of Champaign and State of Illinois, have invented new and useful Improvements in Laminated Wheels, of which the following is a specification, reference being had to the accompanying drawings, forming a part thereof.

The purpose of this invention is to provide an improved construction of wheels, particularly for small machinery, especially adapted for gear-pinions, but not limited strictly to that class of wheels.

The invention consists in a wheel which is made of laminæ of sheet metal, thin relatively to but not necessarily thinner than the width of the projections, recesses, or apertures which constitute the features of the wheel when made, assembled, and retained together, as set out in the claims.

Figure 1:
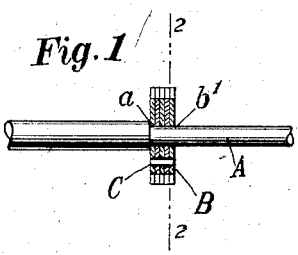
Figure 2:
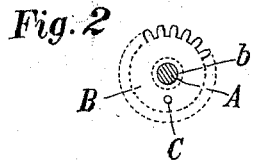
Figure 3:
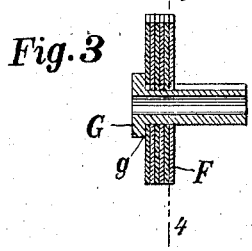
Figure 4:
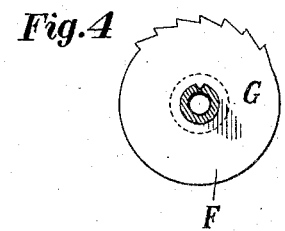
Figure 5:
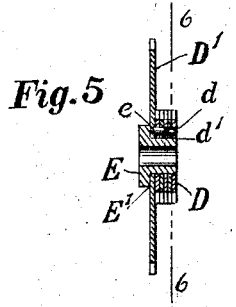
Figure 6:
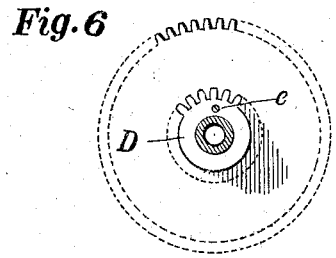
Figure 7:
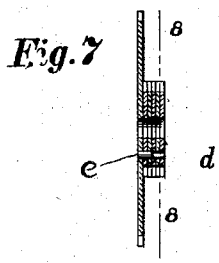

In the drawings, Figure 1 is an axial section of a gear-pinion made according to this invention mounted on its staff. Fig. 2 is a section at the line 2 2 on Fig. 1. Fig. 3 is an axial section of a ratchet-wheel made according to this invention, having its disks mounted on a hollow hub or staff which constitutes part of the wheel. Fig. 4 is a section at the line 4 4 on Fig. 3. Fig. 5 is an axial section of a combined gear and pinion wheel made according to this invention, having the disks of which it is composed mounted on a hollow hub or sleeve which constitutes a part of the wheel. Fig. 6 is a section at the line 6 6 on Fig. 5. Fig. 7 is a section, and Fig. 8 a side elevation, of a combined pinion and gear wheel made according to this invention. Fig. 9 is a side elevation of a pinion of slightly-modified construction.

This invention is designed to supersede the method of making toothed wheels which are of considerable width, as in case of pinions, but which have comparatively thin teeth, which involves cutting the teeth one by one, or the method which involves casting or molding the wheels. Both of these methods are expensive, and very accurate and comparatively expensive machinery is required to cut such gears with any approach to the accuracy necessary for their purposes in the trains in which they are used. I avoid all these expensive methods of producing such wheels by building them up of die-cut laminæ, all of which having been cut by the same die, being assembled or accumulated to the desired thickness of the wheel to be made, with their outlines registering point for point as they are cut—that is, so that corresponding points on the several disks or laminæ cut at a given point of the die coincide in the assembled pile, will be perfectly coincident throughout their entire outlines, and will constitute a wheel which will be, in effect, solid, provided only that the disks are laterally contiguous successively. Such disks or laminæ cut from sheet metal so thin that clean sharp outlines may be formed with the die being driven onto a staff or pin singly would be liable to wabble on the same, because of the thinness of the metal affording so narrow base of support on the staff or pin; but a considerable number of such disks, all having apertures cut for a drive fit on the staff or pin and being assembled, registering, as described, and compacted against each other as they are driven thereon serve to so firmly brace each other laterally that the aggregation stands rigid, as if it were a solid piece of metal driven onto the alining support or connection.

When the wheel is one which is to revolve loose on a shaft, the same method of assembling the disks or laminæ to make them brace each other and produce a wheel rigid, as if solid or integral, may be employed by assembling the disks on a hollow hub or sleeve, which thus becomes a part of a wheel, adapted to be mounted loosely on a shaft passing through the sleeve or on an eccentrically-located alining-pin. When the disks or laminæ are assembled directly on a shaft on which the pinion which they constitute is to be rigid, they may preferably be compacted against a shoulder on the shaft.

In order that the corresponding points of all the disks or laminæ may register perfectly, so as to produce a wheel having the efficiency of a solid wheel, the disks should preferably in cutting be provided in some manner with a feature which can be recognized for registration of the disks with each other, so as to bring the points which are cut with the same point of the die coincident. If the wheel in its normal contour has any irregularity, as an exceptional tooth or an exceptional recess, it will serve as a registering feature; but if it is a gear having uniform and uniformly-spaced teeth, not presenting any feature easily recognized for distinguishing one tooth from another, the die will be provided with means for cutting a registering feature apart from the regular teeth—as, for example, a small aperture—and the disks or laminæ being then assembled with these apertures registering will thereby have all the teeth properly registering.

In Figs. 1 and 2 I have shown on a staff A disks or laminæ B, having uniform teeth, so as to constitute a pinion, having a registering feature consisting of a puncture C, a plurality of such disks or laminæ being assembled compactly contiguous on the shaft, being compacted against the shoulder $a$, provided for that purpose. A central aperture $b'$ of the disks is cut for a drive fit on the shaft, so that the disks being compacted against each other brace each other, as described, and operate as a rigid integral wheel.

In Figs. 3 and 4 there is shown a ratchet-wheel, the irregularity of whose outline makes that outline constitute a registering feature; but regardless of this means of registering or alining the corresponding points of the several disks, each of said disks or laminæ F has the circumference of its central aperture interrupted or rendered irregular by an inwardly-protruding tooth $f$, which takes into a corresponding groove $g$ in the hub or sleeve G, on which the disks are assembled—preferably against a shoulder $g'$—the disks having their central apertures cut for drive fit on said hub and being adapted thereby to brace each other so as to form a wheel of adequate thickness, the corresponding points of whose periphery are perfectly alined by the engagement of the tooth $f$ in the channel $g$, resulting in a wheel which operates substantially as if it were a single piece of metal instead of a plurality of laminæ. The hub or sleeve G, having any irregularity or departure from perfect circular form, as the groove $g$, serves as an alining element when coöperating with disks which have their apertures provided with a corresponding or counterpart irregularity, and by the term "alining aperture" as used in the claims I intend to denote any aperture which serves this purpose, either by being eccentrically located or by having some eccentricity in its outline, since, obviously, the alining capacity is obtained in either case.

In Figs. 5 and 6 there is shown a combined pinion and gear wheel, of which the pinion portion is made of a plurality of disks or laminæ D, all cut with the same die and having an eccentrically-located alining or registering aperture $d$ occupied by an alining-pin $e$. The central apertures $d'$ and the alining aperture $d$ are cut for a drive fit on the hollow hub or sleeve E and on the alining-pin $e$, respectively, onto which they are driven and compacted against the gear-disk D', interposed between them and the flange or shoulder E', thereby making a rigid combined pinion and gear for running loose on the shaft.

Figure 8:
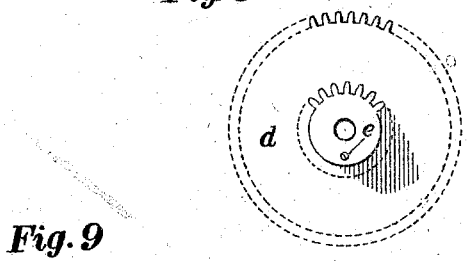
Figure 9:
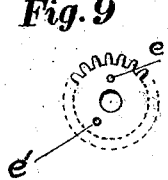

Figs. 7 and 8 show a combined pinion and gear wheel formed without a central hub or sleeve. The disks in this wheel have the eccentric alining or registering aperture $d$, occupied by an alining-pin $e$, onto which the disks are driven with a drive fit, so that the alining-pin alone performs the function which is in other forms of the device performed by the central staff, of holding the disks compactly contiguous by virtue of the drive fit. The disks being thus assembled by being driven onto the alining-pin, while also centered on a staff of suitable diameter passed through their center openings, the result is a wheel as substantially unitary and permanent as if the drive fit were contained on the central shaft, and as long as the wheel is used by being mounted for rotation on such central shaft there is no possibility of the disks becoming displaced relatively, even if their drive fit on the alining-pin were not so tight as to prevent them from being turned about that pin, because such turning will be prevented by the central staff on which they are mounted, even though loose enough for rotation. For greater security in some cases it may be preferable to employ two alining-pins, and such construction is indicated in Fig. 9, which is a side elevation of a pinion formed in this manner, the second alining-pin being indicated by the character $e'$. When two alining-pins are employed, the apertures for them should not be made diametrically opposite, but rather a little out of line with the center, as shown in Fig. 9, so that the disks cannot be assembled relatively reversed, as would be possible if the two alining apertures were in diametric line.

I claim—

1. A toothed wheel built up from identically die-cut sheet-metal disks or laminæ having each two identically-located apertures for assembling and securing together the disks with their respective points cut by the same point of the die registered or alined, and means for holding them compactly contiguous successively.

2. A toothed wheel consisting of a plurality of toothed sheet-metal disks of identical outline, all having a central aperture and an eccentrically-located registering feature, in combination with a rigid element driven tight through the central apertures of the disks, the disks being assembled on the central element in lateral contact successively.

3. A toothed metal wheel consisting of a plurality of thin sheet-metal disks of identical outline, having each a central aperture and an eccentrically-located registering feature, in combination with a shouldered shaft or staff on which the disks make a drive fit and are driven against the shoulder and in lateral contact successively.

4. A toothed metal wheel comprising a plurality of thin sheet-metal disks of identical outline, having each a central aperture and an eccentrically-located registering feature, in combination with a tubular hub or staff, having an annular flange forming a shoulder, the disks being assembled with a drive fit on such tubular hub or staff against said shoulder and in lateral contact successively.

5. A toothed metal wheel built up from identically die-cut sheet-metal disks or laminæ having a central aperture and assembled with their respective points cut by the same point of the die registered or alined, in combination with a central staff on which said disks are mounted with a drive fit compactly contiguous successively.

6. A toothed wheel consisting of a plurality of toothed sheet-metal disks of identical outline having an identically-located alining aperture in combination with a rigid element driven tight through said alining apertures, the disks being assembled thereon compactly contiguous successively.

7. A toothed wheel consisting of a plurality of toothed sheet-metal disks of identical outline having a plurality of identically-situated alining or registering apertures; rigid alining elements extending through said apertures respectively and making drive fit with the disks therein, the disks being assembled on such alining elements compactly contiguous successively.

In testimony whereof I have hereunto set my hand, in the presence of two witnesses, at Champaign, Illinois, this 22d day of February, 1906.

PERCY L. CLARK.

In presence of—
E. S. CLARK,
NELLIE LONG.